US008031684B2

(12) United States Patent
Roadknight

(10) Patent No.: US 8,031,684 B2
(45) Date of Patent: Oct. 4, 2011

(54) NODAL POLICY INCLUSIVE TECHNIQUES FOR OPERATING AN AD HOC NETWORK

(75) Inventor: Christopher M Roadknight, Woodbridge (GB)

(73) Assignee: British Telecommunications PLC, London (GB)

( * ) Notice: Subject to any disclaimer, the term of this patent is extended or adjusted under 35 U.S.C. 154(b) by 1318 days.

(21) Appl. No.: 11/629,204

(22) PCT Filed: Jun. 13, 2005

(86) PCT No.: PCT/GB2005/002339
§ 371 (c)(1),
(2), (4) Date: Dec. 12, 2006

(87) PCT Pub. No.: WO2005/125122
PCT Pub. Date: Dec. 29, 2005

(65) Prior Publication Data
US 2007/0230421 A1    Oct. 4, 2007

(30) Foreign Application Priority Data

Jun. 22, 2004 (GB) .................................. 0413971.3
Sep. 15, 2004 (GB) .................................. 0420521.7

(51) Int. Cl.
*H04W 4/00* (2009.01)
(52) U.S. Cl. ........ 370/338; 370/229; 370/230; 370/231; 370/232; 370/233; 370/234; 370/235; 370/352; 370/355; 709/220; 709/221; 709/245; 709/246; 709/247; 709/248; 709/249
(58) Field of Classification Search .................. 370/338, 370/229–235, 352, 355; 709/220, 221, 245–249
See application file for complete search history.

(56) References Cited

U.S. PATENT DOCUMENTS 5,341,477 A    8/1994    Pitkin et al.
(Continued)

FOREIGN PATENT DOCUMENTS

EP    0384339 A2    8/1990
(Continued)

OTHER PUBLICATIONS

International Search Report and Written Opinion dated Dec. 23, 2005.

(Continued)

*Primary Examiner* — Rafael Pérez-Gutiérrez
*Assistant Examiner* — Liton Miah
(74) *Attorney, Agent, or Firm* — Nixon & Vanderhye PC

(57) ABSTRACT

A method of operating an ad hoc network comprising a plurality of devices (11-16). Each device includes communication means for communicating with other ones of the plurality of devices when they are in range. The method involves storing on each device one or more nodal policies (1-6) which specify rules for determining how a device should behave in response to various prevailing circumstances and controlling each device to operate in accordance with one or more of the stored nodal policies. Additionally, each device stores a fitness parameter and adjusts the value of the fitness parameter in dependence upon the level of activity of the device (in particular, activity which is consistent with its stored policies). Additionally, each device monitors the value of its stored fitness parameter and the activity of its communication means and transmits (46, 48, 49), to other ones of the devices which are in range (13, 15, 16) one or more of its stored nodal policies (5) in the event that its fitness parameter exceeds a threshold of value and its communication means is not required for other purposes.

14 Claims, 9 Drawing Sheets

U.S. PATENT DOCUMENTS

| | | | |
|---|---|---|---|
| 5,539,883 | A | 7/1996 | Allon et al. |
| 5,940,622 | A | 8/1999 | Patel |
| 5,963,447 | A | 10/1999 | Kohn et al. |
| 5,970,064 | A | 10/1999 | Clark et al. |
| 6,226,273 | B1 | 5/2001 | Busuioc et al. |
| 6,272,544 | B1 | 8/2001 | Mullen |
| 6,310,883 | B1 * | 10/2001 | Mann et al. ............... 370/408 |
| 6,393,474 | B1 | 5/2002 | Eichert et al. |
| 6,449,650 | B1 | 9/2002 | Westfall et al. |
| 6,473,851 | B1 | 10/2002 | Plutowski |
| 6,477,150 | B1 | 11/2002 | Maggenti et al. |
| 6,490,255 | B1 | 12/2002 | Kiriha et al. |
| 6,585,778 | B1 * | 7/2003 | Hind et al. ............... 715/235 |
| 6,628,610 | B1 | 9/2003 | Waclawsky et al. |
| 6,701,342 | B1 | 3/2004 | Bartz et al. |
| 6,728,748 | B1 | 4/2004 | Mangipudi et al. |
| 6,952,401 | B1 * | 10/2005 | Kadambi et al. ............ 370/232 |
| 6,982,955 | B1 | 1/2006 | Marshall et al. |
| 6,985,442 | B1 | 1/2006 | Wang et al. |
| 2002/0010798 | A1 | 1/2002 | Ben-Shaul et al. |
| 2003/0014538 | A1 | 1/2003 | Roadknight et al. |
| 2003/0177262 | A1 | 9/2003 | Roadknight et al. |
| 2004/0071147 | A1 | 4/2004 | Roadknight et al. |
| 2004/0077462 | A1 * | 4/2004 | Brown et al. ............... 482/8 |

FOREIGN PATENT DOCUMENTS

| | | |
|---|---|---|
| EP | 0889656 A3 | 11/2000 |
| EP | 1221786 A1 | 7/2002 |
| WO | WO 99/30460 | 6/1999 |
| WO | WO 00/33204 | 8/2000 |
| WO | WO 01/59991 A3 | 8/2001 |
| WO | WO 02/23817 A1 | 3/2002 |
| WO | WO 03/017592 A1 | 2/2003 |
| WO | WO 03/034664 A1 | 4/2003 |

OTHER PUBLICATIONS

International Searching Authority (Communication Relating to the Results of the Partial International Search dated Jun. 10, 2005.
UK Search Report dated Mar. 1, 2005.
UK Search Report dated Nov. 22, 2004.
Marshall et al., "Management of Future Data Networks", IEEE 2001, pp. 1143-1148.
Roadknight et al., "Future Network Management—A Bacterium Inspired Solution", circa 1997.
Boulis et al., Aggregation in Sensor Networks: An Energy-Accuracy Trade-Off, pp. 128-138, IEEE 2003.
Carle, "Energy-Efficient Area Monitoring for Sensor Networks", 20004 IEEE, pp. 40-46.
Munaretto et al., "Policy-Based Management of Ad Hoc Enterprise Networks", 2002.
Shen et al., "Adaptive Autonomous Management of Ad Hoc Networks", 2002 IEEE.
McGrath et al., "The Actcomm Project: Mobile Agents and Ad Hoc Routing Meeting Military Requirements for Information Superiority", pp. 413-417, 2001 IEEE.
Marshall et al., "Emergent Quality of Service—A Bacterium Inspired Approached", circa 1999.
Marshall et al., "Evolutionary Approaches to Management of Pervasive Computing", May 19, 2003, http://homepages.feis.herts.ac.uk/~nehaniv/EN/seec/abstracts/marshall.html.
Phanse et al., "Addressing the Requirements of QoS Management for Wireless Ad Hoc Networks", circa 2002.
Roadknight et al., "Management of Future Data Networks: An Approach Based on Bacterial Colony Behavior", circa 2001.
Roadknight et al., "Sensor Networks of Intelligent Devices", circa 2002.
Broch et al., "A Performance Comparison of Multi-Hop Wireless Ad Hoc Network Routing Protocols", MobiCom '98, Oct. 25-30, 1998.
Chen et al., "Threshold-Based Admission Control Policies for Multimedia Servers", Computer Journal, Oxford University Press, Surrey, GB., vol. 39, No. 9, 1996, pp. 757-766, XP000720396.
Goldszmidt, "Load Management for Scaling Up Internet Services", NOMS '98 IEEE Network Operations and Management Symposium, New Orleans, LA, Feb. 15-20, 1998, IEEE Network Operations and Management Symposium, New York, NY:IEEE, US, vol. 3, Conf. 10, Feb. 15, 1998, pp. 828-835, XP000793430.
Colajanni et al., "Adaptive TTL Schemes Fro Load Balancing of Distributed WEB Servers", Performance Evaluation Review, Association for Computing Machinery, New York, NY, US, vol. 25, No. 2, Sep. 1, 1997, pp. 36-42, XP000199853.
Shimamoto et al., "A Dynamic Routing Control Based on a Genetic Algorithm", Proceedings of the International Conference on Neural Networks (ICNN), San Francisco, Mar. 28-Apr. 1, 2993, New York, IEEE, US, vol. 1, Mar. 28, 1993, pp. 1123-1128, XP010111747.
U.S. Appl. No. 11/629,204, filed Dec. 2006, Roadknight.
Marshall et al., "Adaptive Management of an Active Service Network", BT Technology Journal, vol. 18, No. 4, Oct. 1, 2000, XP002175974.
Yang et al., "Building an Adaptable, Fault Tolerant, and Highly Manageable Web Server on Clusters of Non-Dedicated Workstations", Parallel Processing, 2000, Proceedings, 2000 International Conference on Aug. 21-24, 2000, pp. 413-420, XP002175975.
IBM Technical Disclosure Bulletin, vol. 37, No. 2B Feb. 1994, pp. 215-217, Statistics Gathering and Analyzing Tool for Open Software Foundation's Distributed Computing Environment.
IBM Technical Disclosure Bulletin, vol. 38, No. 7 Jul. 1995, pp. 511-515, Dynamic Load Sharing for Distributed Computing Environment.
International Search Report dated Oct. 31, 2001.

* cited by examiner

NODAL POLICY INCLUSIVE TECHNIQUES FOR OPERATING AN AD HOC NETWORK

This application is the US national phase of international application PCT/GB2005/002339 filed 13 Jun. 2005 which designated the U.S. and claims benefit of GB 0413971.3 and GB 0420521.7, dated 22 Jun. 2004 and 15 Sep. 2004, respectively, the entire content of which is hereby incorporated by reference.

FIELD OF THE INVENTION

The present invention relates to an ad hoc network and in particular to a method of operating an ad hoc network in which multiple small devices having limited processing power and communication bandwidth co-operate on a peer to peer basis without any centralised controlling mechanism to permit data to be transmitted between devices forming part of the ad hoc network.

BACKGROUND TO THE INVENTION

The present inventors have previously developed a protocol inspired by the way in which colonies, of bacteria evolve to adapt to changing environments. This protocol was originally designed for use in an active network in which the switching nodes of the network are capable of performing more than the simple switching functions traditionally assigned to the switching nodes within a data or telecommunications network. The protocol is described in detail in the following published International patent applications: WO 01/59991; WO 02/23817; WO 02/073889, the contents of which are hereby incorporated herein by way of reference.

The protocol is described in greater detail in the above described applications, but in brief, the protocol enables the active nodes to swap small chunks of software (often referred to as nodal policies), each of which controls a corresponding chunk of functionality of the node, between one another to modify the functionality of each node accordingly. This is analogous to the way in which bacteria within a colony swap small pieces of genetic material with one another to alter the functionality of individual bacteria. The swapping is controlled simply by permitting a "successful" bacterium to distribute chunks of genetic material to the colony which are then picked up by neighbouring bacteria which are less "successful". In the natural case of bacterial colonies, success is determined by the amount and rate of metabolising nutrients to generate energy. In the analogous protocol designed by the present inventors, the success of individual nodes is determined by the amount and rate at which services are performed by the nodes.

The inventors anticipated that the protocol could be applied usefully to ad hoc networks formed by a number of simple devices having limited processing and communicating capabilities. However they had not actually attempted to do so and so it was not known how well the technology would transfer to such an environment.

SUMMARY OF THE INVENTION

According to a first aspect of the present invention, there is provided a method of operating an ad hoc network, the ad hoc network comprising a plurality of devices each of which can communicate with other ones of said plurality of devices when they are in range of one another, operational circumstances permitting, the method comprising: each device storing one or more nodal policies and behaving in accordance with one or more of said stored nodal policies; each device storing a fitness parameter and updating said fitness parameter by increasing it during periods of activity of the node and decreasing it during periods of inactivity; and each node transmitting one or more of its stored nodal policies to neighbouring nodes in dependence upon the value of its fitness parameter and each node storing received nodal policies in dependence upon its fitness parameter, wherein each device suppresses transmission of a nodal policy in the event that a stored nodal policy dictates that the node should simultaneously be sending data to one or more neighbouring devices.

The inventors have discovered that operating the ad hoc network in this manner leads to an excellent performance of the network. In particular, by using the same communication channel for transmitting data as well as policies, the scarce resource of bandwidth in a typical ad hoc network is utilised to the full for transmitting data whenever possible. However, there will still tend to be periods of inactivity in an ad hoc network for even the most successful nodes and this natural down-time provides sufficient bandwidth for transmitting policy information to enable the network to evolve to adapt to changing environments etc.

Preferably, the amount by which the fitness parameter is increased in response to a period of activity varies in inverse dependence to the number of neighbouring devices it has in range. In this way, devices which manage to stay active despite being in communication with only a few neighbouring devices (the topology of the devices being—it is supposed—out of the control of the individual devices) are assumed to be fitter than those which are only equally active despite having more neighbouring devices with which to interact.

In one preferred embodiment, the method is employed to form a sensor network comprising a plurality of sensing devices operating autonomously to enable the devices to collect and wirelessly transmit back to a processing centre sense data from a reasonably hostile environment. When employed in this fashion, one or more nodal policies may specify that under certain specified conditions, a device may use some of its processing resources to compress sense data which it is storing for later onward transmission. Preferably, one type of compression which the device may perform is to compare a target stored measurement with corresponding reference stored measurements taken at different times, determine if the target stored measurement is within a predetermined acceptable error range of an estimated measurement derivable from the reference measurements according to a predetermined formula, and if so, to delete the target measurement. Subsequently, at the processing centre, the deleted measurement may be "recovered" (with an acceptable error) by generating the estimated measurement using the same formula as that used by the compressing device to determine whether or not to delete the target measurement in the first place. As an example, the reference measurements could be the temporally immediately preceding and following measurements of the target measurement, and the predetermined formula could be taking the average of the reference measurements.

According to a second aspect of the present invention, there is provided a device for use in forming an ad hoc network when placed in communication with other compatible devices, the device comprising: communication means for communicating with other devices forming part of said ad hoc network; storage means for storing nodal policies; processing means for processing the stored nodal policies and behaving accordingly and also for determining a level of fitness associated with the device; wherein the device is operable to transmit via the communication means one or more of its nodal policies to neighbouring devices in dependence upon detecting that its level of fitness is above a predetermined threshold and that it is not using the communication means to transmit data in accordance with a stored nodal policy.

The communication means is preferably, but not necessarily, a radio transceiver. Alternative communication means or transceivers might however use sonar or optical transmission methods, for example.

According to a third aspect of the present invention, there is provided an ad hoc network comprising a plurality of devices according to the second aspect of the present invention.

Further aspects of the present invention relate to corresponding computer programs and carrier mediums carrying such computer programs. Examples of carrier mediums for this purpose are magnetic or optical disks, solid state memories or a carrier signal suitably modulated or a series of low level packets to enable, for example, the program or programs to be downloaded onto such a memory over an analogue or digital network.

BRIEF DESCRIPTION OF THE FIGURES

In order that the present invention may be better understood, embodiments thereof are now described, by way of example only, with reference to the accompanying drawings in which.

DETAILED DESCRIPTION OF THE EMBODIMENTS

Figure 1:
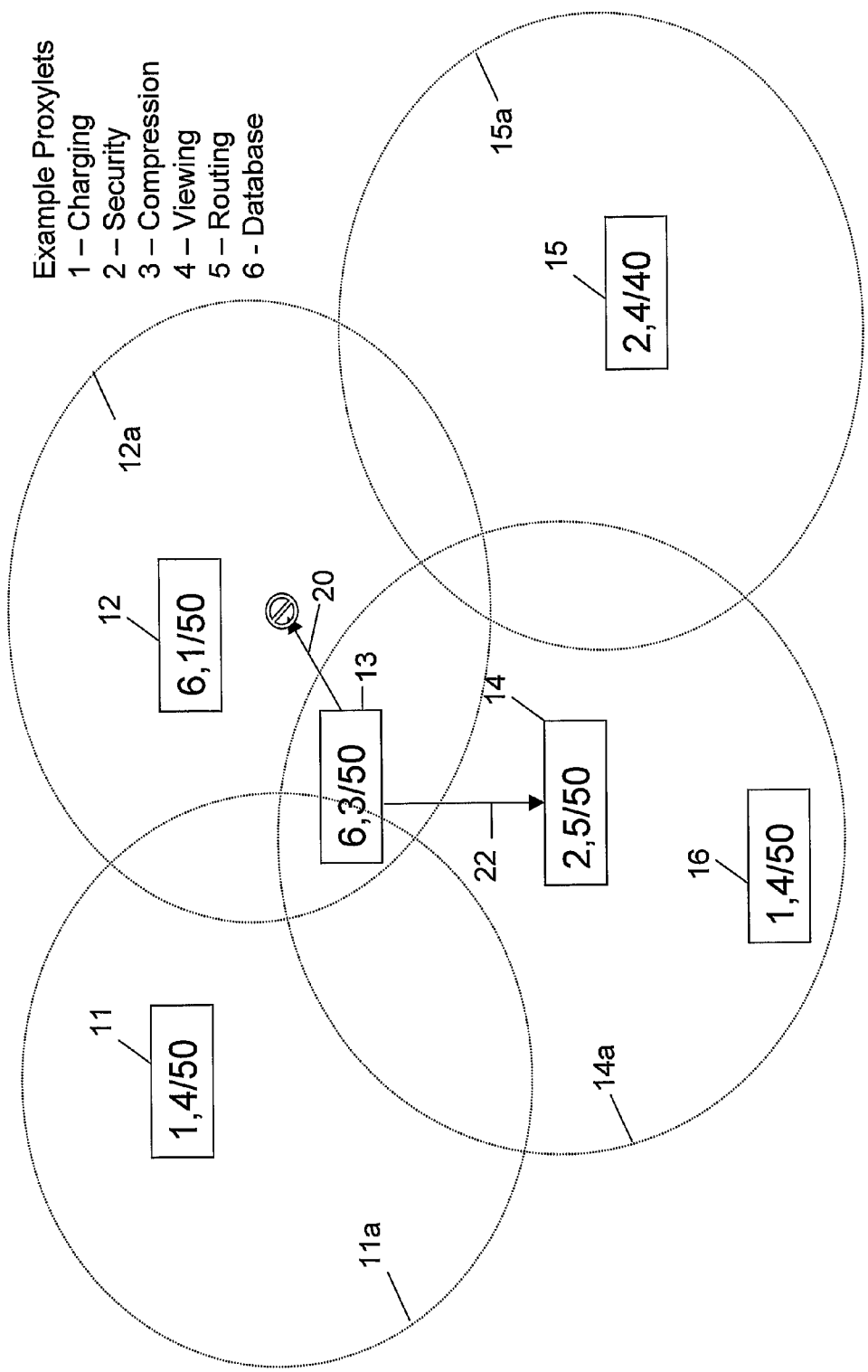
FIGS. 1 to 6 are schematic diagrams illustrating the positions and states of various mobile devices within an ad hoc network according to a first embodiment of the present invention at each epoch over a series of six consecutive epochs.

In overview, the ad hoc network of the present invention assumes that the devices forming (individual nodes of) the ad hoc network have only a limited amount of bandwidth with which to communicate data (hereinafter data is used to refer to everything which the devices communicate between one another other than genetic material—i.e. nodal policies). The second assumption is that data should be treated as time critical in order for the network to function efficiently whereas, because of the nature of the bacteria colony inspired genetic algorithm for improving the efficiency of the network overall, genetic information may be distributed at a slower pace. Finally, it is assumed that the nature of the network is going to be such that there will be periods when nodes are not sending data and that during these periods the same channel of communication may be used to send the less time critical genetic information between nodes.

Two different embodiments are therefore described below which embody the above assumptions. The first embodiment clearly sets out an example arrangement which embodies the above assumptions. The second embodiment has been simulated and the performance analysed and found to perform well.

First Embodiment

The first embodiment relates to an ad hoc network formed from a plurality of personal digital assistant type devices, each having a mechanism for communicating with other such devices over a limited bandwidth wireless communication channel provided that the devices are within range of one another, are switched on and are not blocked (eg by being in a lift shaft, etc.).

In this embodiment, each device has functionality which enables devices which are in range of one another to communicate with one another in an effective manner. This involves enabling each device to broadcast to, and to be received by, each other device up to a predetermined maximum number of devices within a predetermined interval of time referred to as an epoch. Such functionality requires solving issues such as collision, noise, interference etc. These are considered to be low-level issues with which the present invention is not concerned. In particular the invention is not concerned with issues relating to the 2 lowermost levels according to the 7 layer OSI reference model (i.e. the physical layer and the link layer).

The only way in which the low level functionality is relevant to the present invention is that it is assumed that such communications will be of a broadcast nature rather than a point to point nature. It will however be apparent to the reader that the present invention could easily be adapted to a point to point type communication method without too much modification. A large amount of work has been done and is still being done at present to improve communication protocols of this type for use in ad hoc networks, and any suitable such protocols could be used by the present invention. Examples of currently available such protocols are given in 'Ad Hoc networking', Charles E. Perkins, Pub. Addison Wesley, December 2001 and the references cited therein or in The Handbook of Ad Hoc Wireless Networks' Mohammad Ilyas (Editor).

In the present embodiment, each device is programmable and able to perform many different functions in accordance with user preferences. One of the functions which is provided in the present embodiment is a communications layer of functionality which receives, as input, data for transmission to neighbouring devices in the ad hoc network and outputs data received from neighbouring devices in the ad hoc network (throughout the specification, the term neighbouring devices is used to refer to those other devices within the network with which any given device is able to communicate directly via the air interface). In the present embodiment, this is configured to perform such communications once in a period of time, hereinafter referred to as an epoch, which period of time may vary depending on user preferences, number of neighbouring devices, etc.

Sitting conceptually above this communications layer (in the sense of the ISO seven layer model of data communications) is the bacterial algorithm layer which controls the functionality, described in greater detail below, of storing policies, controlling operation of the device in accordance with the policies and carrying out the general functions required to enable the bacterial algorithm to function correctly.

In addition to the low level functionality for enabling communications, and controlling the operations of the device according to the bacterial evolution algorithm, each device in the present embodiment also runs an application which is operable to accept a request from a user to display a particular document and to initiate a search over the ad hoc network for such a document if it fails to find the requested document stored locally.

EXAMPLE

Figure 5:
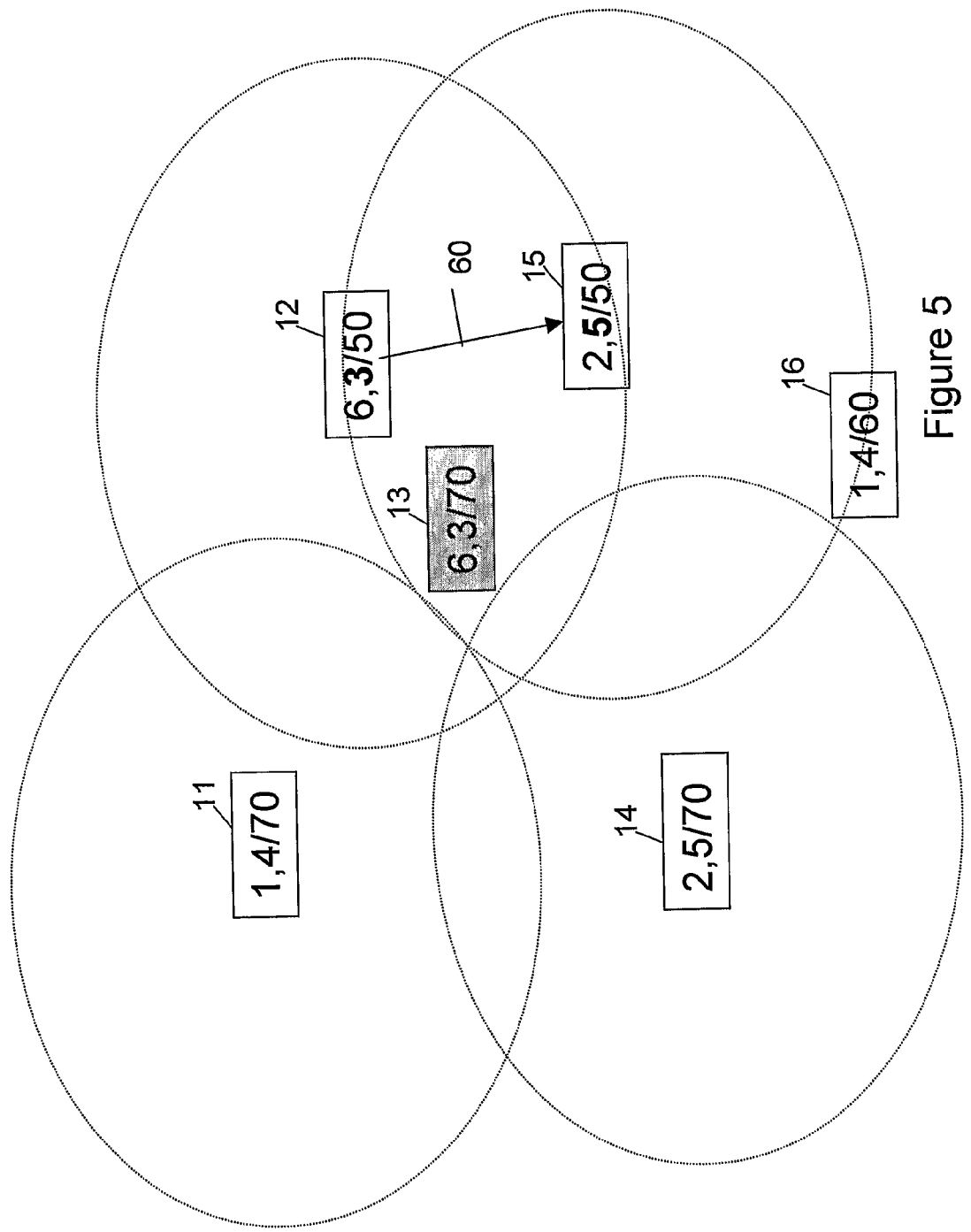
Figure 6:
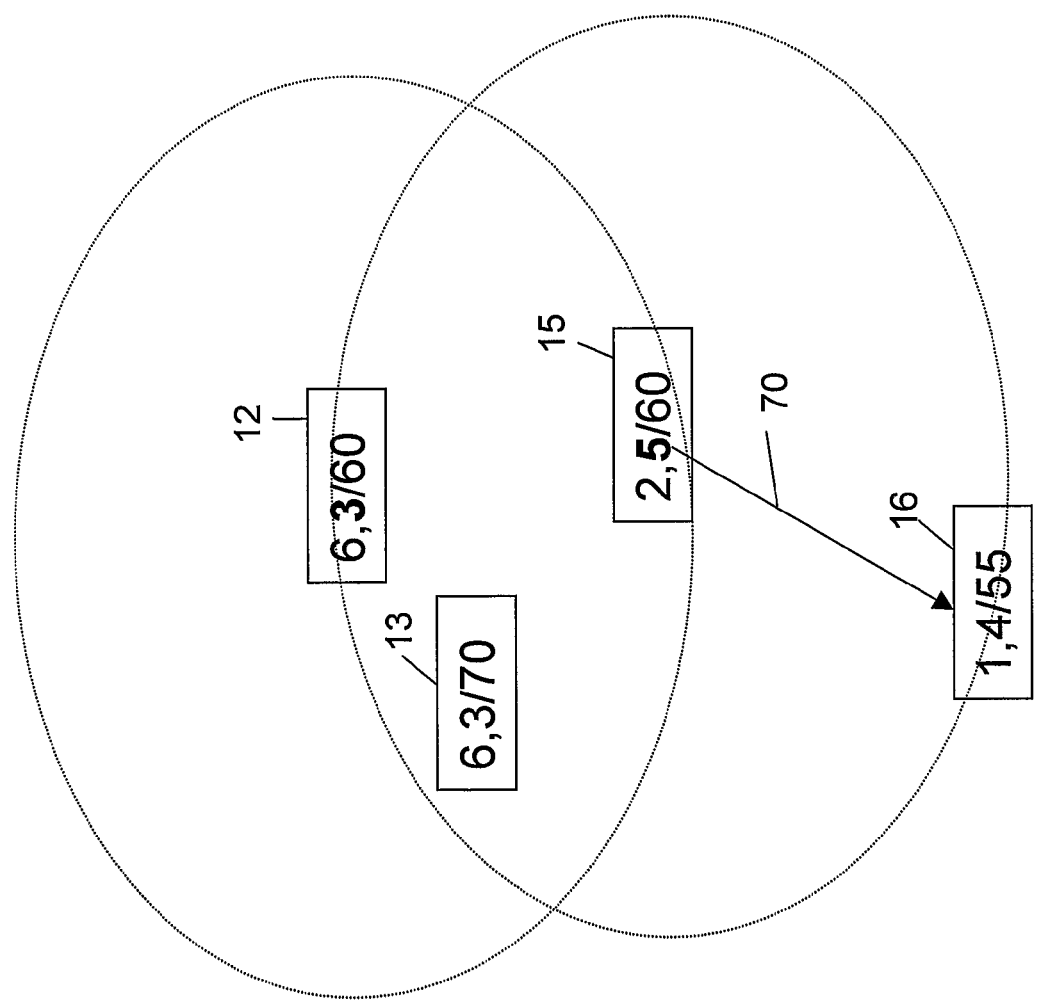
Figure 7:
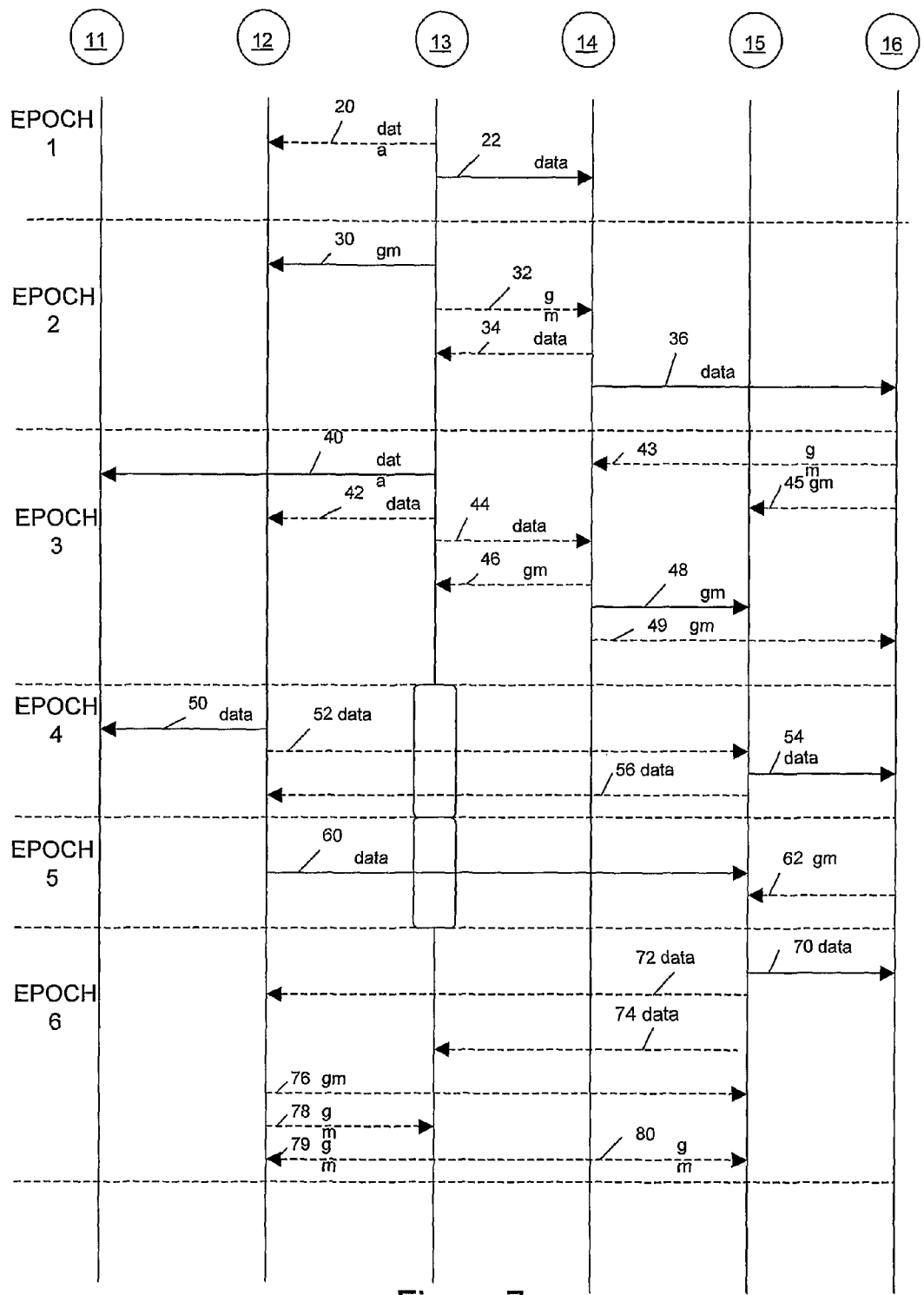
FIG. 7 is a sequence diagram showing the sequence of messages passed between the devices in the six epoch period illustrated by FIGS. 1 to 6.

Referring now to FIGS. 1 to 6 and to FIG. 7, this example follows the steps carried out by each of six devices 11, 12, 13, 14, 15 and 16 over 6 consecutive epochs. In the present embodiment, each epoch includes a first part which is not explicitly illustrated in any of FIGS. 1 to 7 in which a device may transmit to its neighbouring devices a request for receiving data and such a request (but only that type of request) may be responded to within the same epoch by a node which has received such a request.

In FIG. 1, each of the devices 11-16 is represented as a rectangle containing three integers in the format x,y/z in which x and y represent the proxylets currently stored by each device and actively used. The term proxylet is used herein to refer to a small program which adds functionality to the behaviour of a device acting as a node in the ad hoc network in an analogous way to that in which applets add functionality to web browsers. The integer z represents the fitness level parameter of the device.

In the present embodiment, the devices are very simple proof of concept devices in which all of the functionality above the low-level communication functionality discussed above is provided by the above-mentioned proxylets and each device is only able to store and use two proxylets at any one time. Of course, in alternative more sophisticated systems each device might be able to store many different proxylets alternatively, or in addition, more sophisticated devices might be able to run many diverse applications employing a sophisticated operating system such that the proxylet execution environment would represent only one such application and data would be able to be passed easily between different applications running on the device.

In this simple embodiment therefore only 6 proxylets are available, numbered 1 to 6, as follows: 1 Charging (this is required to enable a user to receive data from the ad hoc network and to charge the user an appropriate fee for obtaining data from the network in this manner); 2 Security (this proxylet permits a node to perform encryption and decryption of data); 3 Compression (this proxylet permits a node to compress data prior to sending); 4 Viewing (this proxylet enables a user of the device to view received data—it includes means for issuing a request for specified data from the network if it is not available locally and, in the present embodiment, it also requests that such data be sent in a compressed format and performs the necessary decompression—prior to displaying the data to a user on the PDA's screen); 5 Routing (this proxylet enables requests for data to be routed towards a node able to satisfy the request and data from a remote node to be routed towards the originally requesting node); and 6 Database (this proxylet enables the device to store data and to transmit it back towards a requesting node in response to a request for the data from another node).

If a device receives a request to which it is able to respond successfully (because it contains the appropriate proxylet or proxylets) it will send the appropriate responding signal. If a device is neither transmitting nor receiving a request-related signal (ie not simply a genetic material signal), then it will either look to receive or to transmit a genetic material signal depending on whether it's fitness is below a lower threshold or above an upper threshold respectively (if it is in-between these thresholds it will neither transmit or receive any gm signals). A device increases in fitness by receiving or transmitting a request-related signal, and loses fitness by doing nothing. In a sparsely populated environment a node may sometimes have no option but to do nothing, this could be distinguished from the lack of wireless communication of any kind. There would be no penalty for doing nothing out of necessity. Transmitting or receiving a gm signal tends to allow a device to maintain its current fitness level.

In the present example illustrated in FIGS. 1 to 7, some of the devices (11, 12, 14 and 15) have their ranges of communication illustrated as dotted circles (11a, 12a, 14a, 15a). Thus it can be seen from FIG. 1 that the following pairs of nodes are within range of each other: 12 & 13; 13 & 14; and 14 & 16. Nodes 11 and 15 have no neighbouring nodes.

Prior to the epoch illustrated in FIG. 1, node 16 has (as a result of user control of the device) requested that it be sent a certain specified piece of data for viewing by the user. Also prior to the epoch illustrated in FIG. 1, this request has now been received by node 14 which contains a routing proxylet and thus attempts to route the request onwards.

Thus, in Epoch 1, node 14 issues a (broadcast) request for data which is ignored by node 16 (since it is the original requester) but which causes node 13 (since it has the Database proxylet 6 and the compression proxylet 3 and it also happens to be storing the requested item of data) to respond to the request from node 14 with a data signal 22 to routing neighbouring node 14. Note that since all communications are sent, in this embodiment, in a broadcast manner to all neighbouring nodes, node 13 also transmits a signal 20 to its other neighbouring node 12, but since this node has not requested this data it simply ignores the signal as illustrated in FIG. 1 by the "no-entry" symbol.

Note that FIG. 7 also shows node 13 transmitting signals 20 and 22 to nodes 12 and 14 respectively in Epoch 1. In FIG. 7, the fact that signal 20 is ignored by the receiving node is indicated by the broken nature of the arrow illustrating signal 20 whilst a solid arrow is used to illustrate signal 22 which is received and processed by node 14. The fact that both signals are data signals is indicated by the word data written above the arrows representing signals 20 and 22.

As mentioned above, each node maintains a fitness parameter. At the end of each epoch, the fitness parameter is modified according to a set of rules. In the present embodiment, the following rules are employed: 1) if the device has no neighbours for that Epoch (i.e. it is out of range or otherwise prevented from communicating with any other devices for that Epoch) the fitness parameter remains unchanged; 2) if the device either transmits or receives a genetic material signal (and therefore not a data signal) the parameter remains unchanged; 3) if the device transmits or receives a data signal the parameter value is incremented by 10 points; 4) if the device neither transmits nor receives any signals with a neighbouring device even though it did have one or more neighbours with which it could have thus exchanged a signal, then the fitness parameter is decremented by 5 points.

Thus, as can be seen by comparing FIGS. 1 and 2 (which show the values of the fitness parameters of the nodes at the beginning of Epochs 1 and 2 respectively), the fitness parameter values of the six nodes change as follows between the beginning and end of Epoch 1: node 11 maintains its fitness parameter at 50 because it has no neighbours during the first Epoch; node 12's fitness decreases from 50 to 45 because although it could have communicated with node 13 it did not (because it was not interested in receiving signal 20 containing the data requested by node 16); node 13's fitness increases from 50 to 60 because it transmits data signal 22 (and 20); node 14's fitness increases from 50 to 60 because it receives data signal 22; node 15's fitness remains unchanged at 40 because it has no neighbours during Epoch 1; and node 16's fitness decreases from 50 to 45 because although it could have communicated with node 14 it does not make any communication during Epoch 1.

In Epoch 2, the principal activity is the sending of a signal 36 carrying the requested data (originally from node 13) from node 14 to node 16. In addition to this (as shown in FIG. 7) the signal is also broadcast to neighbouring node 13 (as unwanted signal 34).

However, in the present embodiment, each device is operable to send a selected one of its proxylets (together with any accompanying usage information specifying under what circumstances the proxylet should be used) as a genetic material (gm) signal to neighbouring devices if the following conditions are met:

1) the device has a fitness parameter value of greater than 50; and
2) the device is not actively transmitting or receiving data to or from a neighbouring device.

Furthermore, each device is additionally operable to accept any gm signals broadcast to it from a neighbouring device and to substitute a new proxylet received in this manner for one of its own stored proxylets provided the following conditions are met:

1) the device has a fitness parameter of less than 50; and
2) the device is not actively transmitting or receiving data to or from a neighbouring device.

Figure 3:
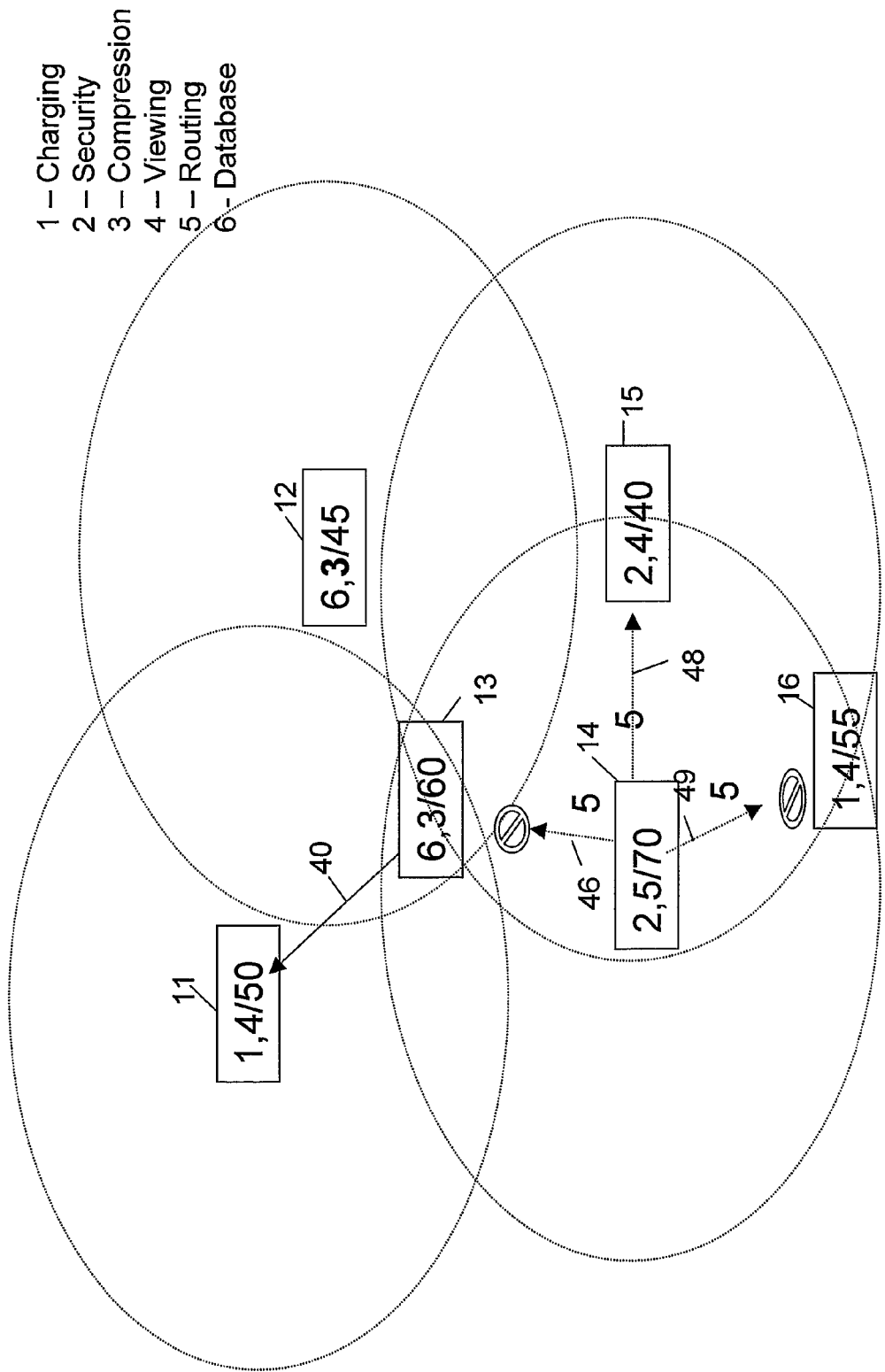

Therefore, in Epoch 2, device 13, which has a fitness parameter value of 60 and is not transmitting or receiving any data signals, transmits a gm signal to both nodes 12 and 14 (signals 30 and 32 respectively) which is accepted by node 12, which has a fitness parameter of 45 and is not transmitting or receiving any data signal, and which therefore substitutes the received proxylet 3 for its own previously stored proxylet 1 (c.f. FIG. 3). (Note that in the present embodiment proxylets are exchanged on a first-in-first-out basis; however, in an alternative embodiment, a present proxylet to be exchanged for a new one could be selected on a random basis or on a last-in-first-out basis instead.) Node 14 however, does not receive the broadcast signal because its fitness parameter is 60 and because it is transmitting a data signal (either of which reason, on its own, would be sufficient to block reception of the gm signal).

Figure 2:
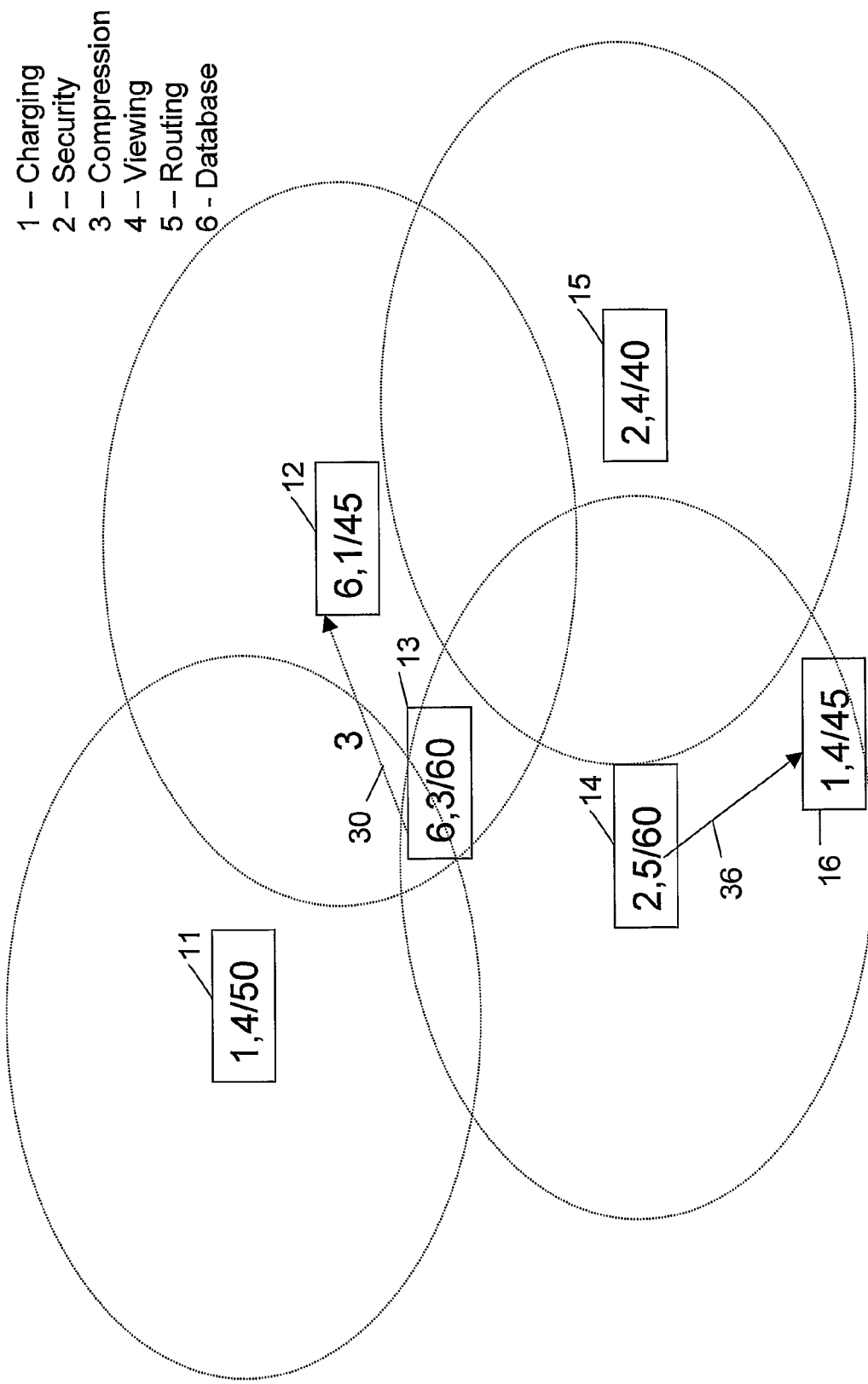

Referring now to FIGS. 2 and 3, at the end of Epoch 2 (or, equivalently, at the beginning of Epoch 3) each node's fitness changes as follows (during Epoch 2): node 11 maintains its fitness parameter at 50 because it has no neighbours during Epoch 2; node 12's fitness remains constant at 45 because it receives a gm (genetic material) signal 30 from node 13; node 13's fitness remains constant at 60 because it transmits gm signal 30; node 14's fitness increases from 60 to 70 because it transmits data signal 36 (and 34); node 15's fitness remains unchanged at 40 because it has no neighbours during Epoch 2; and node 16's fitness increases from 45 to 55 because it receives data signal 36 during Epoch 2.

At the beginning of Epoch 3 node 11 is within range of node 13. It is not explicitly illustrated but as a first part of the Epoch node 11 transmits a request for data to node 13 which happens to have the relevant requested data (as well as having the required proxylets 3 and 6). Therefore, the principal data transfer signal in Epoch 3 is node 13 transmitting the requested data to node 11 by means of data signal 40 (additionally the data is broadcast by means of unwanted signals 42 and 44 to nodes 12 and 14 respectively).

Also during Epoch 3, node 14 is idle (i.e. it is not receiving or transmitting any data signals) and has a fitness parameter value greater than 50 (it is 70) and it therefore transmits gm signals 46, 48, 49 to all of its neighbours (i.e. nodes 13, 15 and 16). Nodes 13 and 16 reject the gm signals (because they have too high a fitness score—and also node 13 is busy transmitting a data signal) but node 15 is both idle and has a fitness score below 50 (it is 40) so it accepts the gm signal (which in this case contains proxylet 5) and stores the newly received routing proxylet 5 in place of viewing proxylet 4 (see FIG. 4). Node 16 is also idle during Epoch 3 and thus also attempts to transmit some of its genetic material (proxylet 1) to both of its neighbours, nodes 14 and 15 with signals 43 and 45 respectively. However, node 14 rejects the signal because its fitness parameter is too high (it is not less than 50); node 15 rejects the signal because it receives signal 48 from node 14 in preference because node 14's fitness parameter is higher than that of node 16 (note that this requires that in the present embodiment a node transmitting genetic material also informs the receiving nodes of its fitness level in order to enable the receiving node(s) to decide which signal to accept in the event of competing signals; in alternative embodiments a decision could be made randomly, or more than one such signal could be received at the same time, bandwidth permitting, etc.).

Figure 4:
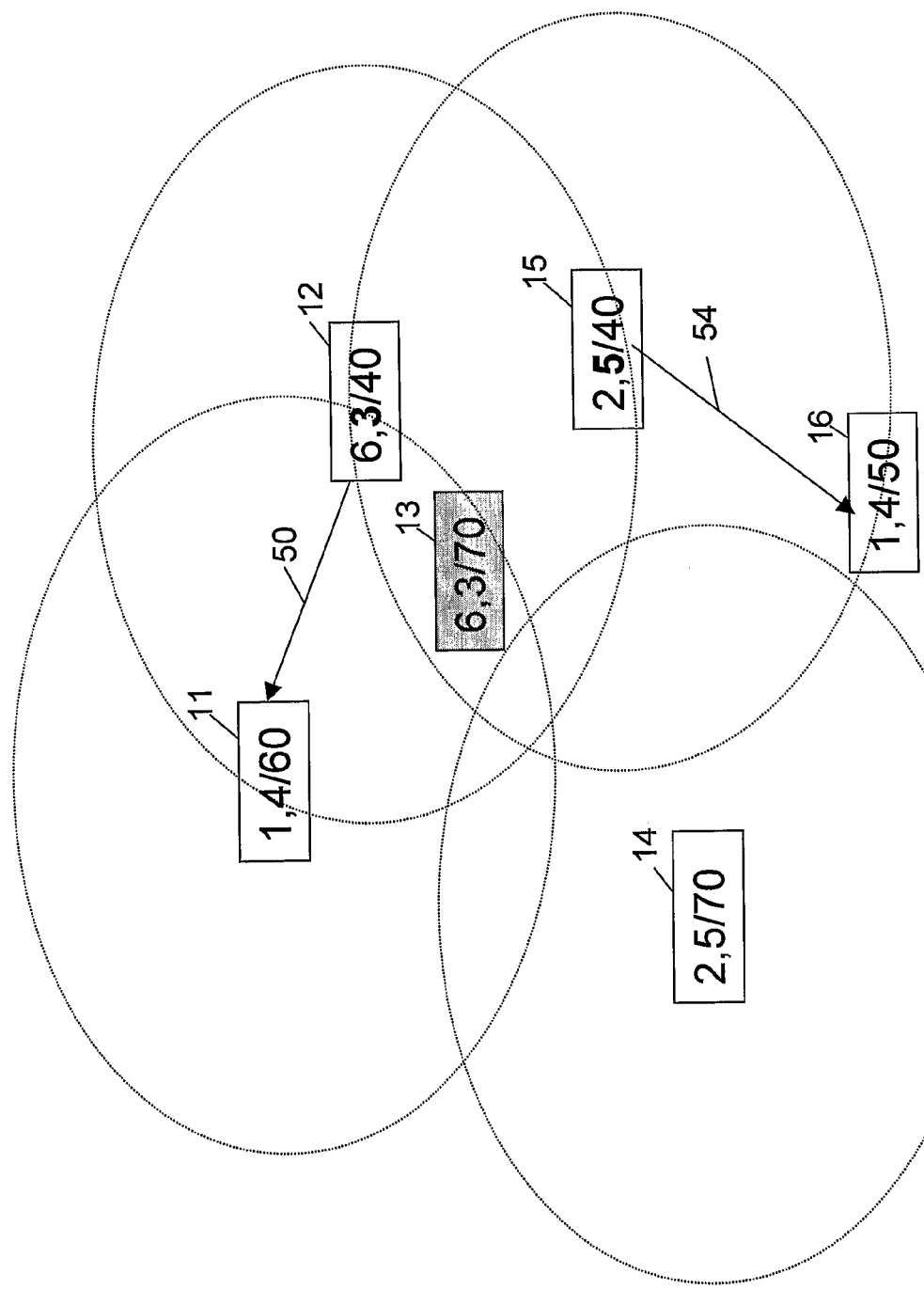

Referring now to FIGS. 3 and 4, at the end of Epoch 3 (or, equivalently, at the beginning of Epoch 4) each node's fitness is as follows: node 11 increases its fitness parameter from 50 to 60 because it receives data signal 40 during Epoch 3; node 12's fitness decreases from 45 to 40 because it neither transmits nor receives any signals during Epoch 3; node 13's fitness increases from 60 to 70 because it transmits data signal 40; node 14's fitness remains unchanged at 70 because it transmits gm signal 48; node 15's fitness remains unchanged at 40 because it receives gm signal 48 during Epoch 3; and node 16's fitness decreases from 55 to 50 because it does not (successfully) transmit or receive any signals during Epoch 3.

In Epoch 4 node 13 loses communication with all of its surrounding nodes (for example because it has entered a region which blocks communication (eg a lift shaft) or because it has lost power temporarily, etc.). Node 11 continues to want to receive more data; since node 13 has lost connection with node 11, node 12 (which now contains the correct proxylets for responding to such a request, namely proxylets 6 (database) and 3 (compression)) replaces node 13 and supplies the desired data to node 11 by way of signal 50. The data is also broadcast (via signal 52) to node 12's other neighbour node 15; however, since node 15 has not requested this data it ignores signal 52. Node 14 sits idle during Epoch 4 because it has moved out of range of all of the other nodes so that it has no neighbours with which to communicate. Node 15 has received a request for some data from its user (not shown) and accordingly has issued a (broadcast) request signal (not shown) for the data which has been received by node 15 (node 16's sole neighbour). Node 15 does not have the appropriate data or proxylets for directly responding to the request with the desired data but instead sends a return signal 54 indicating that it will onward route the request; as with all signals in this embodiment, the return signal is broadcast such that a signal 56 is also generated and received by node 12. However, in this embodiment, node 12 ignores signal 56 because the return message is addressed only to node 16.

Referring now to FIGS. 4 and 5, the fitness levels of the nodes therefore change during Epoch 4 as follows: node 11 increases its fitness parameter from 60 to 70 because it receives data signal 50 during Epoch 4; node 12's fitness increases from 40 to 50 because it transmits data signal 50 during Epoch 4; node 13's fitness remains unchanged at 70 because it has no neighbours during Epoch 4; node 14's fitness remains unchanged at 70 because it also has no neighbours during Epoch 4; node 15's fitness increases by 10 from 40 to 50 because it transmits return routing message signal 54 to node 16 during Epoch 4; and, similarly, node 16's fitness increases by 10 from 50 to 60 because it receives signal 54 during Epoch 4.

In Epoch 5 (see FIGS. 5 and 7) node 15 issues a (broadcast) request for data to which node 12 (since it has the Database proxylet 6 and the compression proxylet 3 and since it also happens to be storing the requested item of data) responds with a data signal 60 to routing neighbouring node 15. All of nodes 11, 13 and 14 are idle because they have no neighbours in Epoch 5. Node 16 attempts to transmit a gm signal 62 to its sole neighbouring node 15 because it is not involved in any request related signals during Epoch 5 and because its fitness parameter is above the upper threshold (fitness parameter (60)>upper threshold (50)); however, node 15 ignores signal 62 because it is receiving a request-related data signal 60 from node 12.

Referring now to FIGS. 5 and 6, the fitness levels of the nodes therefore change during Epoch 5 as follows: node 11's fitness parameter remains unchanged at 70 because it has no neighbours during Epoch 4; node 12's fitness increases from 50 to 60 because it transmits data signal 60 during Epoch 5; node 13's fitness remains unchanged at 70 because it has no neighbours during Epoch 5; node 14's fitness remains unchanged at 70 because it also has no neighbours during Epoch 5; node 15's fitness increases by 10 from 40 to 50 because it receives data signal 60 from node 12 during Epoch 5; and node 16's fitness decreases by 5 from 60 to 55 because it neither receives nor (successfully) transmits any signal during Epoch 5.

Referring now to FIG. 6, during Epoch 6 node 15 retransmits the data which it received from node 12 in the previous Epoch to the originally requesting node 16 by way of data signal 70. Nodes 11 and 14 have now completely moved out of view and remain idle because they have no neighbours during Epoch 6. Nodes 12 and 13 (which has come "back online" for Epoch 6) both try (unsuccessfully) to transmit some of their genetic material to neighbouring nodes because their fitness levels are above the upper threshold and they are not involved in any request related data signals; however, none of the other nodes are in a position to receive gm signals and so none of the gm signals are successfully transmitted and received in Epoch 6. Node 12's unsuccessful gm signals are signal 76 to node 15 and signal 78 to node 13, whilst node 13's unsuccessful signals are gm signal 79 to node 12 and gm signal 80 to node 15. The signal 72 going back towards node 12 from node 15 is ignored by node 12 because it has only just transmitted this data to node 15 and it is not interested in receiving it back, and similarly the signal 74 also containing the same data to node 13 is also ignored because node 13 has not requested this data and does not contain the relevant proxylets for onward routing the data.

It will be apparent to the reader that at the end of Epoch 6, the nodes will have the following fitness levels: node 11 fitness=70, node 12 fitness=55, node 13 fitness=65, node 14 fitness=70, node 15 fitness=70, node 16 fitness=65. The fitness rewards used were coarse and large so as to demonstrate behaviour, in as few as steps as possible. A real implementation would have a much more subtle penalty/reward structure with rewards being based on payment and Quality of service and penalties based on drop rates, latency and payment.

Alternatives to First Embodiment

It will be apparent to the reader that many alterations could be made to the first embodiment. For example, a more elaborate set of rules could be used so as to alter the fitness levels in a more sophisticated manner. For example, the amount of change in fitness level could depend to some extent on the actual fitness level to avoid reaching the extremes of 0 or 100% either too quickly or at all. Also, the amount of change in fitness could depend on the number of nearest neighbours in a more sophisticated manner (in the above example there are two categories, namely no nearest neighbours in which case fitness remains constant and one or more nearest neighbours in which case fitness does change), such as, for example, varying the amount of change of fitness in direct proportion to the number of nearest neighbours, or by having three or more separate categories (eg zero neighbours, one or two neighbours, and three or more neighbours) etc.

Second Embodiment

As mentioned in the introduction, an algorithm for distributing software on an active network has been previously developed by the present inventors. It was speculated that a similar approach could be used to provide services on an ad-hoc network. The second embodiment described here has been simulated both with and without special adaptations for use of the algorithm in an ad hoc network. The results show that while a direct transferral of the approach from an active network to an ad hoc network shows good performance figures, modifying the algorithm with special adaptations to take account of some of the characteristics of an ad-hoc network gives a surprisingly strong set of performance figures. Surprisingly, the algorithm actually seems to be more suited to an Ad-Hoc network than to a fixed Active network. The low hardware spec of mobile devices (when compared to fixed devices) means much more care is needed as to what software is placed on the device and what is downloaded when needed, so as to place the right software on the right nodes at the right time.

In an effort to prove the applicability of the bacteria based adaptive algorithm, a set of simulation experiments were devised that tested various networked device scenarios.

The Experiment was broken up into 3 sections:
1. an unmodified "bacterial" Algorithm was tested (i.e. simulated) in an active network scenario (as previously reported) where there is 'limitless' bandwidth between devices, devices are 100% reliable and maintain a fixed neighbourhood structure;
2. the same unmodified algorithm was then tested (i.e. simulated) in a more Ad-Hoc style environment where devices are less reliable, have smaller bandwidth connections and do not maintain a fixed structure;
3. finally, the algorithm was modified to include certain special adaptations to make it more applicable to Ad-Hoc networks and re-tested and re-simulated in the Ad-Hoc style environment.

All three simulations involved using four nodes, each of which forwards requests which it is unable to satisfy itself. The nodes to which unsatisfied requests are forwarded depends on the node in question as follows:
Node 0 forwards to Nodes 1 and 3,
Node 1 forwards to Nodes 2 and 0,
Node 2 forwards to Nodes 3 and 1, and
Node 3 forwards to Nodes 0 and 2.

To make the nodes less reliable in the "Ad-Hoc" type environment of the second and third simulations, each node is randomly made inactive X % of the time and each connection is randomly brought down Y % of the time. The bandwidth of connections is made virtually smaller by only allowing Z requests to be passed during any one epoch (any unpassed requests are queued and dropped if they time out). The lack of a fixed network is simulated by changing the two forwarding recipients at random intervals. The modifications which increase aptitude to Ad-Hoc networks are:
1. Passing genetic data only when there is spare bandwidth—there is a fixed bandwidth between devices that is used to pass data and control variables, the genetic characteristics are also passed this way. In a wireless ad-hoc network this is decided by the frequency, range and the power output (watts) used. The requirement for the control variables is intermittent so it with the new bandwidth constraints required for Ad-Hoc networks using bandwidth more sparingly provides surprisingly large benefits. Sending non-time critical communication in quiet periods is a very beneficial means of optimising the algorithm. 'Quiet periods' are when the node neither sends nor receives data or requests during the most recent send and receive windows.

2. Broadcasting configuration data to all neighbours—in a wireless environment there is an inherent efficiency in one node broadcasting to many recipients. Some nodes may be busy and unable to receive but the sending node experiences no extra load when sending it's configuration data in broadcast mode as opposed to unicast fashion. While some wireless transmission is directional (directional transmitters and receivers) there will be a large number of networks for which the wireless transmission is non-directional and in these cases the benefit is significant.

In all cases the performance metrics (fraction of data packets dropped, and total number of data packets received by the sink) are compared with the performance of a stochastic approach and a caching approach.

Initial results show:

a) making the simulation 'Ad-Hoc' increases latency and drop rate significantly across all algorithms; this is to be expected as nodes are offline or unreachable for a proportion of the time, and bandwidth is limited;

b) a genetic/bacterial approach continues to provide the most adaptive solution; and c) enhancing the genetic/bacterial approach algorithm with special Ad-Hoc focussed modifications significantly improves performance further.

The algorithm for device decision making according to the present embodiment is not identical to the approach described in International patent applications: WO 01/59991, WO 02/23817, and WO 02/073889 so the algorithm and the simulation environment are outlined below:

The model devised is that of a simple Ad-hoc sensor network, a network of devices with the task of gathering data from a site whilst also optimising their battery usage. The simulation set up can be described by the following statements:

Each device within the network is given the capability to move around geographically following a bounded random walk.

Each device can be active or inactive during each timestep (epoch).

Each device has a battery that is used and monitored, and is recharged during periods of inactivity.

The task is to route data sensed at nodes to some central data 'sinks'.

There are three qualities of data to be sensed, high medium and low.

Each device puts every item of data sensed or received via forwarding into a FIFO queue. This data is then acted upon (deleted, combined or forwarded). The queue length is initially set at 50, if the queue at any time exceeds 50, any newly sensed data is simply dropped rather than being stored.

The new task allocation algorithm is described by the following statements:

Nodes are able to carry out one role per epoch. Sensing, Forwarding, Deleting, Compressing or inactive (these roles will be discussed below).

Each node decides on what state to be in during each epoch based on a set of values and random numbers. Eg. A node may have the behaviour values:

Sensing 20%
Forwarding 50%
Deleting 2%
Compressing 3%
Inactive 25%

Therefore it will be Sensing 20% of the time, Forwarding 50% of the time and so on.

These values are modified in 2 ways, local rules and evolutionary, fitness based rules.

Local rules act on these values based on the internal values of battery level and queue length.

```
1. If queue is greater than (random number(0-1) * 15) then
   relay * 1.05
   sense * 0.95
   combine * 1.01
       If queue is less than (random number(0-1) * 15) then
   relay * 0.95
   sense * 1.05
   combine * 0.99
2. If queue > 45 Then node_plasmid(i).sense = 0
3. If queue > 30 Then
       relay + 0.02
       sense − 0.03
       delete + 0.01
       combine+ 0.01
   if queue <30 then
       relay − 0.02
       sense + 0.03
       delete = 0
       combine − 0.01
4. if battery < 100 then
       relay * 0.95
       sense*0.95
```

Fitness based rules use a fitness indicator to decide if the values for the node should be changed, either randomly of by copying the values from a neighbouring node. This resembles the same bacterial evolutionary approach to the above-mentioned international patent applications and is a long term method of learning. Nodes are given fitness rewards for sensing data and forwarding data. The initial settings for the node are randomly decided.

The different possible roles are:

Sensing: this involves taking measurements and either storing the resultant data for subsequent forwarding or, if the queue length is too long, simply discarding the sensed data. In the present embodiment all possible types of measurement which the device is able to take are taken during a single sensing period, however, in alternative embodiments this could be varied between only taking one measurement, during any one epoch, or taking only a subset of the possible measurements, which subset could be decided in a systematic manner or by nodal policies, etc.

Forwarding: this simply involves broadcasting the next in line piece of data for onward forwarding. Determining which is the next in line is straightforward where there is only one queue. Where there are two separate queues (one for self-sensed data and one for data received from neighbouring nodes) it may be determined in a systematic manner (eg always take from one queue in preference to another, or always alternate, etc.) or it can be determined by nodal policy. In some embodiments, a preferred node for onward transmission may be selected and the broadcast can be addressed solely to that node, alternatively, the data may be forwarded to all nodes in range and each receiving node can decide if it is closer to the sink than the sending node and thus whether or not to receive the data, etc. A number of ad-hoc routing schemes for dealing with these sort of situations are known and any appropriate such scheme may be employed in the present embodiment.

Deleting: this involves selecting a piece of data to be deleted and then deleting it. Deletion may be performed in a systematic method (e.g. look for the oldest, lowest priority, self-sensed piece of data and delete that, selecting one at random if there are more than one items of data equally worthy of being deleted, etc.) or it can be determined by a nodal policy.

Compressing: in the present embodiment, there are two different types of compression which can be performed, which are hereinafter referred to as probabilistic compression and sliding window compression respectively. In probabilistic compression, a new combined measurement is formed from two measurements (preferably temporally adjacent to one another—i.e. without intervening measurements) by taking the weighted average of the two measurements and summing their weights to form a new averaged measurement (for example, if we have measurements (t=10 mins, temp=8 C, weight=1)) and (t=20 mins, temp=10 C, weight=1), these could be combined to form (t=15 mins, temp=9, weight=2), subsequently this could be further combined with a measurement (t=30 mins, temp=12 C, weight=1) to form (t=20 mins, temp=10 C, weight=3). In sliding window compression a target measurement is compared with an estimated value which is calculated, in the present embodiment, using two reference measurements according to a predetermined formula such as a simple average, and if the estimated value is within an acceptable error range, then the target value is deleted (for example, with a target measurement of (t=20 mins, temp=10 C) and reference measurements of (t=10 mins, temp=8 C) and (t=30 mins, temp=12 C) the estimated measurement would be (t=10 mins, temp=12 C) which is equal to the target measurement, and therefore the target measurement is deleted). In order to decide which type of compression to perform a systematic method may be used (eg always perform sliding windows if enough data is available, alternate, etc.) or it may be set by a nodal policy, which can change its decision based on local observations, etc.

Inactive: as mentioned above, in the present embodiment each device has a mechanism for re-charging its battery and during a period of inactivity it may be possible (environmental conditions permitting) for the device to re-charge to some extent its battery level.

Note that in the present embodiment each measurement is stored, processed and forwarded as a separate packet of data which includes an identification of the device which performed the measurement and the time at which the measurement was taken as well as an indication of the type of measurement (e.g. temperature). Where statistical compression is performed, each packet also includes an indication of the weight of the measurement. This has the downside of meaning that each packet of data contains a large proportion of overhead, but it does mean that the node has maximum flexibility for performing greater compression on measurements with lower priorities than measurements having higher priorities, etc. One possibility for reducing the overhead in certain circumstances is to process a number of measurements into a single table-type format before transmitting in such a way that the amount of overhead is reduced prior to transmission.

In the present embodiment,

An Ad-Hoc network simulation was carried out over 4 different scenarios:

Static/On—The nodes don't move and are 100% reliable
Static/Offs—The nodes don't move but are only active 95% of the time
Moving/On—The nodes move around in a random walk fashion and remain on all the time
Moving/Offs—The nodes move around in a random walk fashion and are only active 95% of the time.

The first 2000 epochs show a low drop rate due to the initially highly charged battery state, after a 1000 epochs each node is having to decide more carefully how to use it's limited battery resource. The drop rate for the period 1000-2000 epochs is similar to that over 9000-10000 epochs for three of the four test cases, only in the moving/offs test environment was there improvement in performance. While the moving nodes and unreliability does increase the drop rate a little, this is wholly understandable, given that both movement and unreliability make some nodes completely isolated given the limited transmission range. The fact that performance is stable over the 10,000 time steps is an important achievement and the fact that the most learning is seen in the most dynamic of environments demonstrates the level of success achieved with the modifications, in particular the modification that genetic material is transmitted only during quiet periods.

Similar results are shown for the transmission rate (amount of data making it's way back to the sink). This is also encouraging as it shows that the stable or reducing drop rate is not due to any reduction in data transmission.

Figure 8:
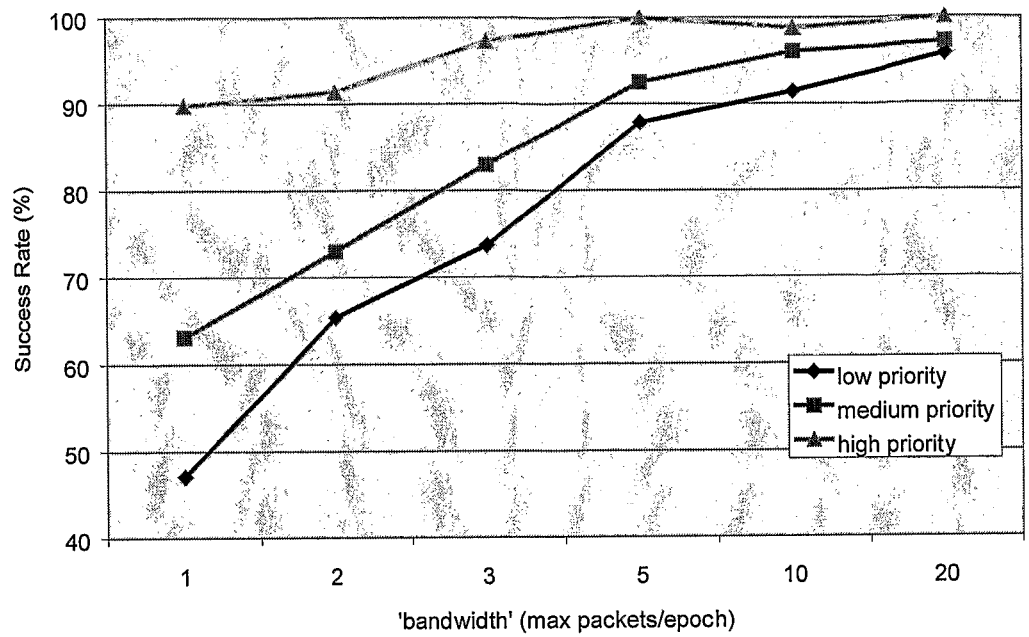
FIGS. 8, 9, 10 and 11 are graphs showing the results of a simulation of another embodiment of the present invention.

FIG. 8 relates to a case in which there are three different levels of priority assigned to different types of data packet. It shows how with the specially adapted bacterial algorithm a decrease in the rate at which devices can transfer data affects the success rate of the three different data types by different amounts. Decrease in performance is clearly dependent on the importance of the three data types. High priority decreasing from 100% 35 to 90%, medium from 97% to 63% and low from 95% to 46% as the bandwidth decreases from a maximum in which up to 20 data packets can be sent per epoch to a minimum tested bandwidth in which only one data packet can be sent per node per epoch. This is a desirable feature given that the less important data is dropped preferentially when the network is more 'stressed'.

Figure 9:
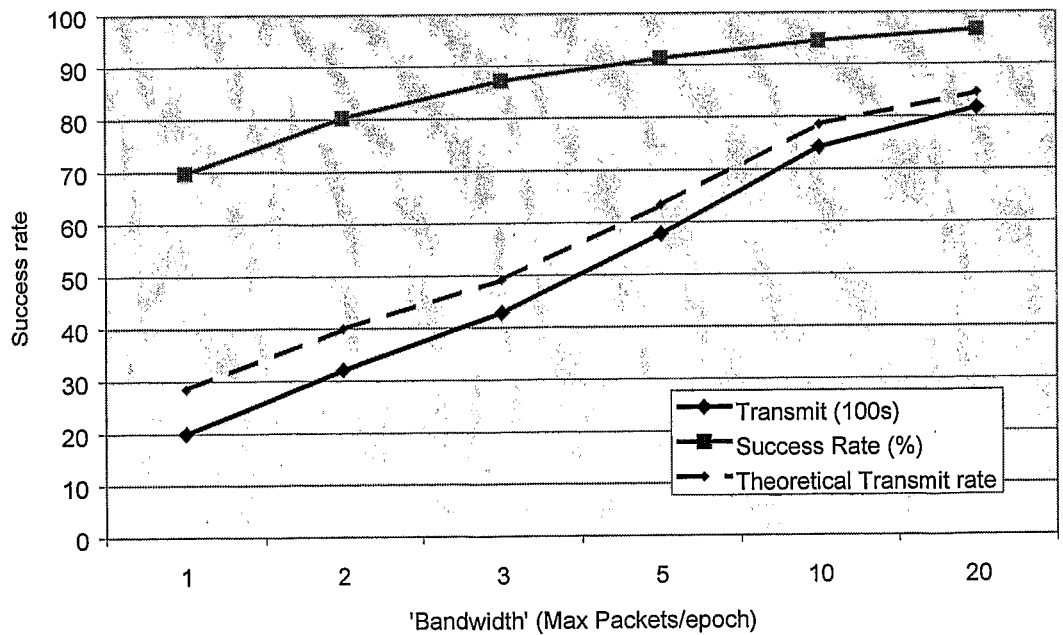

FIG. 9 addresses the issue that when the number of packets that can be sent per epoch decreases there is also an increase in the number of packets being dropped. The question is, does the number of packets dropped account solely for the fall in transmission rate? It is apparent from FIG. 9 that the increased drop rate does not account for very much of the reduction in packets (the hashed line is the number of packets that would have been received if none had been dropped). It seems instead that some backing off is occurring at the sensing points of the network in response to the build up of packets at the nodes nearer the sink which is also desirable behaviour.

Figure 10:
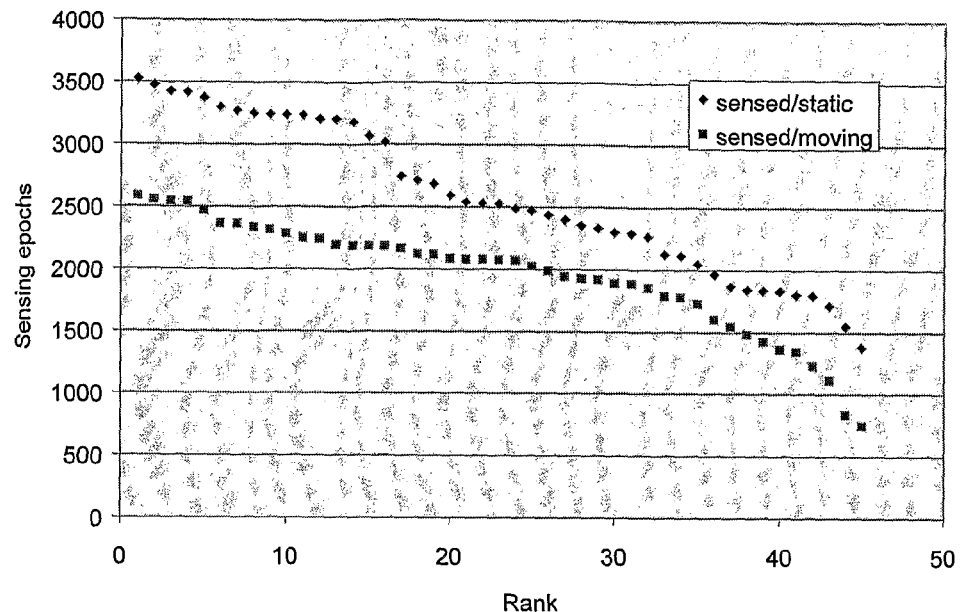

FIG. 10 addresses the effect of the position of a node within the network. The number of sensing epochs each node made during a 10,000 epoch run was measured and plotted against the rank of each node for a static network and a mobile one and the results are shown in FIG. 10. It seems apparent that some nodes are sensing more than others, so a second test was carried out to find out why (see discussion of FIG. 11 below).

Figure 11:
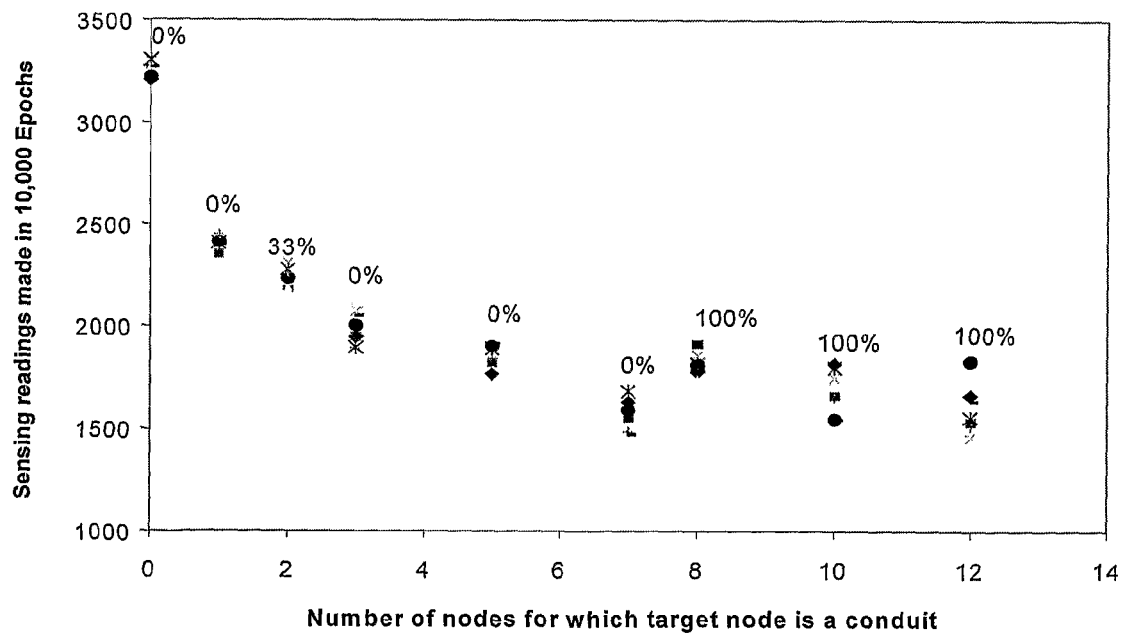

FIG. 11 shows how when the number of nodes for which a node acts as a conduit increases the number of sensing epochs per 10,000 epochs decreases, with the exception that when the nodes involved are adjacent to the sink, the number of sensing epochs increase slightly. In FIG. 11, each plotted point represents the average number of sensings taken by all nodes having the specified number of other nodes for which they act as conduit; since there were 5 different trials used to generate the data for FIG. 11, there are 5 different points for each valid number of nodes for which one or more nodes act as a conduit. The percentage figure above each set of 5 points represents the percentage of the nodes (having the specified number of "conduit" nodes) which are adjacent to a sink node (the sink nodes themselves take no sensing readings and are not included in FIG. 11). Thus, in the second test (whose results are summarised in FIG. 11) each node is a conduit to between 0 and 12 other nodes and, for example, there are 3 nodes that act as conduits for 2 nodes, of these 3 nodes only one is adjacent to a sink, so 33% of '2 conduit' nodes are adjacent to a sink (1 of the three nodes). There is only one node that is acting as a conduit to 12 other nodes and this node is adjacent to a sink so 100% of '12 conduit' nodes are adjacent to a sink. As mentioned above, FIG. 11 shows the result conduit number vs sensing rate for 5 repeat runs, each with different random number seeds.

FIG. 11 thus shows the decline in the number of sensor readings taken as the connected-ness of a node increases. Nodes that are at the extremities of the network and therefore act as conduits to no other nodes collect 2500-3000 readings per 10 000 epoch experiment. Nodes more highly connected take fewer readings (eg. Conduits for 3 nodes collecting 1900-2100 readings, Conduits for 7 nodes collecting 1400-1650). Nodes adjacent to a sink (eg the 8, 10 and 12 conduit nodes) deviate from this curve in that they have higher values than would be expected.

These two findings can be explained by the fact that nodes that act as conduits need to spend more time in 'relay' mode to cope with the increased packet rate. Also nodes adjacent to sinks have the benefit of a constantly ON node to which packets may be sent. Sinks do not suffer from battery depletion like other nodes so are always available as receivers of data.

Alternatives to Second Embodiment

In order to increase the reader's general understanding of the second embodiment, there now follows a brief discussion of an experimental device which has been programmed to implement some of the features of the second embodiment. The device has been made and tested as part of the Self-Organising Collegiate Sensor (SECOAS) Network Project.

The 'algorithm' employed in the experimental device is in fact a hybrid of several decision making and data handling systems. For the purposes of this discussion we will assume that the data being handled has passed through some initial pre-processing. For example, tidal flow can be measured by averaging a number of tilt readings over time. Conventional measurement standards regarding the number of tilt readings that need to be gathered over a time period convert 'tilt readings' into a single 'flow' measurement. There are therefore 3 decision making components:

1. Sliding Window averaging—We can scan a temporal 'Sliding Window' of readings for sufficient deletion conditions. Given a time-series of sensor readings at t0, t1, t2 a simple analysis of the reading at t1 can decide how useful it is. If the reading at t1 is the average of the readings at t0 and t2 then its deletion will make no effect on the characterisation of a time series, given that it's value can be interpolated from readings at t0 and t2. A deviation from the average by a small amount may also be acceptable if improved compression is required. A trade off between loss of information and compression must be made. If we are worried about losing too many sequential values we can preserve any value that is subsequent to a deleted one but this will obviously reduce compression to a maximum of 50%.

2. Local Rules—Internal condition monitoring that affects the frequency of some actions, using negative feedback to obtain a homeostatic behaviour. A node may carry out none, one or many actions during a specific time period. Actions such as sensing, forwarding and queue management. Each action has a cost in terms of queue occupancy, battery usage and bandwidth usage. By monitoring the condition of these resources the probability of carrying out these actions can be modified. For instance, if the queue length is near it's maximum it would prudent to take fewer readings and/or to do more forwarding or if the battery is being used at an unsustainable rate higher battery usage behaviours should be reduced and lower usage ones increased. We term this 'local learning'.

3. Parameter Evolution—A genetic style transfer and fitness based evaluation of internal parameters can enable nodes that are performing well to share their configuration with nodes that are performing less well. Methods 1 and 2 both involve several parameters, values that effect the performance (e.g. Reading at T1 is deleted if + or −Z % of the average of Reading T0, T2. Sensing probability is reduced by X if queue is above Y). Effective values for these parameters are discovered in advance using multi-parameter optimisation on a simulated environment. But this can only be as good as the simulated environment. By encoding these parameters in a genetic fashion the performance of the nodes can be evaluated and the genetic material for the 'fittest' nodes can be spread, while the genetic make up of the less fit nodes is modified or dies out.

These approaches can be used separately or combined. Results on a real data set are discussed further below.

To obtain the data set, a single buoy was deployed that gathered 7 days of data for 6 channels at 10 minute intervals. The 6 channels were Electrical Conductivity (mS), Temp('C), Water depth (m), Turbidity (g/l), Tilt 1 (mV) and Tilt 2 (mV). Due to hardware limitation only the first 3 values were processed using this approach and are discussed below, the other 3 were saved directly to a logger. Further details of the hardware and software installation are available elsewhere [see M. Shackleton, F. Saffre, R. Tateson, E. Bonsma and C Roadknight: "Autonomic computing for pervasive ICT—a whole system approach" BTTJ Vol 22, No 3. 2004; and C. Roadknight, "Sensor Networks of Intelligent Devices," 1st European Workshop on Wireless Sensor Networks (EWSN '04), Berlin, 2004].

It is important to evaluate how much impact each step of the algorithm has so we will evaluate each element in isolation before looking at how the elements perform when combined.

If we look at a sliding window deletion approach it turns out that as we increase the range at which the middle value is deemed interpolate-able we get increased compression, but that this varies with each dataset. There are more complex algorithms to decide whether to delete the middle value of 3 (for instance, using standard deviations of longer time sequences) but this will suffice as a simple first approach. Simplicity is important for transparency but also because the PIC microcontrollers [PIC18FXX2 Data Sheet, Microchip Technology Inc, Document DS39564B, 2002] used for this deployment are not powerful number crunchers and doing advanced floating point statistics would be stretching their capabilities too far. Temperature is the least varying reading, with similar values being recorded frequently. Water depth is far more variant and unpredictable so the sliding window approach is unable to remove as many water depth readings safely.

Deleted values are re-synthesised by taking the average of the previous and the subsequent point, the actual error is then calculated by referring to the original deleted value. For instance we might have three sequential depth readings at 10 minute intervals of 8.35, 8.525, 8.75 meters. With a 'difference from average' value of 50% (i.e. the difference from the average of either of the outer readings is 8.75−8.55=8.55−8.35=0.2, and 50% of this is 0.1 so if the actual reading lies between 8.45 and 8.65) the middle value will be deemed deletable, and when the resulting gap in the series is re-synthesised by averaging the previous and subsequent values an interpolated value of 8.55 is generated, such that this deletion has therefore given rise to an error of 0.025 meters. This is a simple method of estimating missing values, more complex ones may give rise to better approximations. An 'allowable difference' of 50% causes 38.4% of readings to be deleted and an error of 13.45 meters to be introduced, while an 'allowable difference' of 1% causes 13.5% of readings to be deleted and introduces an error of 4.32 meters over the 1008 measurements (about 0.043 cms per reading, when the average reading at 9.13 meters).

The local learning component of the algorithm is more adaptive and is acting on different information, it is not interested in the values themselves but on the effect that making and forwarding readings is having on the condition of the node. Analysis shows how the probability of 4 actions (sense, forward, compress, delete) adapts and stabilises over time. For example, a node that has ample battery and bandwidth can 'afford' to sense nearly every possible reading and forward elements in it's queue at a high rate. Less than one percent of readings are deleted or compressed. However, a node that is far more stressed has insufficient battery to sense and forward every possible reading. Here less than 30% of the possible number of readings are sent and many of these are compressed values made up of the average of 2 or more readings. The strength of the local learning approach in a sensor network environment is that concrete knowledge of battery usage and bandwidth availability are not needed in advance of the experiment, and since these factors are heavily effected by environmental conditions, any estimates usually have to be conservative. If conditions for the experiment are unusually good then a non-adaptive approach would not be able to make use of the unforeseen excess in resources, conversely, if conditions were unusually bad a non-adaptive approach may use the scarce resources too liberally at the initial phases of the experiment leaving no resources for the final stages. An adaptive approach, such as the one proposed, copes well in both scenarios adapting its behaviour accordingly.

The invention claimed is:

1. A method of operating an ad hoc network, the network comprising a plurality of devices that each include communication means for communicating with other ones of the plurality of devices when the other ones of the plurality of devices are in range, the method comprising:
   storing on each device one or more nodal policies which specify rules for determining how a device should behave in response to various prevailing circumstances;
   controlling each device to operate in accordance with one or more of the stored nodal policies;
   storing on each device a fitness parameter;
   each device adjusting the value of the fitness parameter stored thereon in dependence upon the level of activity of the respective device consistent with the stored policies of the respective device;
   each device monitoring the value of the fitness parameter stored thereon and the activity of the communication means thereof; and each device transmitting, to other ones of the devices which are in range, one or more of the nodal policies stored thereon in the event that the fitness parameter thereof exceeds a threshold value and the communication means thereof is not required for other purposes.

2. A method according to claim 1 wherein the rate at which the fitness parameter is changed depends upon the number of other devices within range of the respective device at any one time.

3. A method according to claim 1 wherein the transmission of stored nodal policies is done using a broadcast mechanism such that all of the other devices which are in range may receive the broadcast transmission.

4. A method according to claim 1 wherein the devices are sensing devices and the ad hoc network forms a sensor network, and wherein the method includes pre-processing stored sense data prior to forwarding the sense data on towards a sink node where data from multiple devices is collated, the pre-processing including selectively deleting one or more sense readings in order to reduce the amount of data requiring onward transmission.

5. A method according to claim 4, wherein the selecting of the sense reading for deletion comprises processing a target sense reading and two other sense readings to generate an estimated sense reading based on the two other sense readings and comparing the estimated sense reading with the target sense reading and deleting the target sense reading if the comparison indicates that the target sense reading and the estimated sense reading are within an acceptable error limit of one another, but not otherwise.

6. A method according to claim 5 further comprising subsequently regenerating the estimated sense reading as an estimate of the deleted target sense reading at a location remote from the device at which the target sense reading was taken.

7. A non-transitory computer-readable medium tangibly storing a computer program or programs to perform the method of claim 1.

8. A device for use in forming an ad hoc network, the network comprising a plurality of similar devices, the device comprising:
   communication means for communicating with other ones of the plurality of devices when the other ones of the plurality of devices are in range;
   data storage means for storing one or more nodal policies, which specify rules for determining how the device should behave in different circumstances, and for storing a fitness parameter; and
   processing means for controlling the device to operate in accordance with one or more of the stored nodal policies, for adjusting the value of the stored fitness parameter in dependence upon the level of activity of the device consistent with the stored policies, for monitoring the value of the stored fitness parameter and the activity of the communication means, and for causing the communication means to transmit one or more of the stored nodal policies in the event that the fitness parameter exceeds a threshold value and the communication means is not required for other purposes.

9. A device according to claim 8 wherein the processing means is operable to adjust the value of the stored fitness parameter in accordance with a predetermined function, which function depends on the level of activity of the device consistent with the stored policies and also on the number of other devices which are in range.

10. A device according to claim 8 including at least one sensor and wherein the processing means is further operable to pre-process stored sense data collected by the sensor prior to forwarding the sense data on towards a sink node where data from multiple devices is collated, the pre-processing including selectively deleting one or more sense readings in order to reduce the amount of data requiring onward transmission.

11. A device according to claim 10 wherein the processing means is operable to select a sense reading for deletion by processing a target sense reading and two other sense readings, the processing including generating an estimated sense reading based on the two other sense readings, comparing the estimated sense reading with the target sense reading and deleting the target sense reading if the comparison indicates that the target sense reading and the estimated sense reading are within an acceptable error limit of one another, but not otherwise.

12. An ad hoc network comprising a plurality of devices according to claim 8.

13. A device for use in forming an ad hoc network, the device comprising:
- a transceiver for communicating with other similar devices;
- a data store storing one or more nodal policies, which specify rules for determining how the device should behave in different circumstances, and storing a fitness parameter; and
- an electronic digital processor operable to control the device to operate in accordance with one or more of the stored nodal policies, to adjust the value of the stored fitness parameter in dependence upon the level of activity of the device consistent with the stored policies, to monitor the value of the stored fitness parameter and the activity of the communication means, and to cause the transceiver to transmit one or more of the stored nodal policies in the event that the fitness parameter exceeds a threshold value and the transceiver is not required for other purposes.

14. A method of operating an ad hoc network, the network comprising a plurality of devices each including communication means for communicating with other ones of the plurality of devices when the other ones of the plurality of devices are in range, the method comprising:
- storing on each device one or more nodal policies which specify rules for determining how a device should behave in response to various prevailing circumstances;
- controlling each device to operate in accordance with one or more of the stored nodal policies;
- storing on each device a fitness parameter;
- each device adjusting the value of the fitness parameter stored thereon in dependence upon the level of activity of the respective device consistent with the stored policies of the respective device;
- each device monitoring the value of the fitness parameter stored thereon and the activity of the communication means thereof; and
- each device transmitting, to other ones of the devices which are in range, one or more of the nodal policies stored thereon in the event that the fitness parameter thereof exceeds a threshold value, wherein the rate at which the fitness parameter is changed depends upon the number of other devices within range of the respective device at any one time.

\* \* \* \* \*